United States Patent [19]

Fletcher et al.

[11] 4,045,315

[45] Aug. 30, 1977

[54] SOLAR PHOTOLYSIS OF WATER

[76] Inventors: James C. Fletcher, Administrator of the National Aeronautics and Space Administration, with respect to an invention of; Porter R. Ryason, La Canada, Calif.

[21] Appl. No.: 658,132

[22] Filed: Feb. 13, 1976

[51] Int. Cl.$^2$ ............................ B01J 1/10; B01K 1/00
[52] U.S. Cl. ............................ 204/157.1 R; 250/527
[58] Field of Search ............... 250/527; 204/157.1 R

[56] References Cited

U.S. PATENT DOCUMENTS 3,925,212  12/1975  Tcherner .................... 204/157.1 R

OTHER PUBLICATIONS

Heidt et al., Science, vol. 117, Jan. 23, 1953, pp. 75–76.

Primary Examiner—Howard S. Williams
Attorney, Agent, or Firm—Monte F. Mott; Wilfred Grifka; John R. Manning

[57] ABSTRACT

Hydrogen is produced by the solar photolysis of water in a first photo-oxidation vessel with a transparent wall in the presence of a water soluble photo-oxidizable reagent and an insoluble hydrogen recombination catalyst. Simultaneously oxygen is produced in a second photo-reduction reactor with a transparent wall in the presence of an insoluble photo-reduction reagent catalyst. When spent, the solution from the first reactor is fed into the second reactor. A reaction occurs in the dark in which the redox reagents are regenerated, and the regenerated photo-oxidation reagent solution is recycled to the first reactor. The photo-oxidation reagent is preferably a europium salt, and the first reactor also contains a hydrogen recombination catalyst such as platinum supported on glass beads. The photo-reduction catalyst is a bifunctional reagent catalyst including a transition metal salt such as a manganese oxychloride salt covalently bonded to the surface of a high area support such as glass fibers, together with a hydroxyl or chlorohydroxyl decomposition catalyst of high area.

26 Claims, 2 Drawing Figures

SOLAR PHOTOLYSIS OF WATER

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2457).

BACKGROUND OF THE INVENTION

1. Field of the Invention

The present invention relates to solar photolysis of water to produce pure hydrogen and to various methods and apparatus for conducting such a process.

2. Description of the Prior Art

Self sufficiency in energy is a stated national goal. Most of the proposed means to achieve this goal are either environmentally unacceptable or are not feasible, especially those not depending on fossil fuel sources. Of the available alternatives, solar energy is the most abundant, inexhaustable single resource available. However, capturing and utilizing solar energy is not simple. Methods are being sought to convert solar energy to a concentrated, storable form of energy. A known method, photosynthesis, converts somewhat less than 1% of the suns energy at the earths surface to a solid fuel, i.e., plant materials, which when accumulated and transformed over geologic ages yielded fossil fuels. Current rates of use of these fossil fuels, and the particular geographic distribution and political control of major petroleum resources pose problems for nations that are net petroleum consumers. An alternate method yielding a simpler fuel, at a higher conversion, has long been desired.

Production of hydrogen by the solar photolysis of water would be an extremely desirable fuel, since it would be prepared in high purity, and the combustion product of hydrogen is water which is totally environmentally acceptable. However, it is widely believed that solar photolysis of water is not feasible, especially at quantum efficiency exceeding 1%. Douglas and Yost noted twenty four years ago in J. Chem. Phys. 17, 1345 (1949) and J. Chem. Phys. 18, 1687 (1950) that hydrogen was produced during photolysis of europium (II) solutions. Yields of hydrogen were not measured since their main interest was in europium oxidation. This sole reaction would not lead to a feasible process for photolyzing water since the europium ion would be continuously exhausted by stoichiometric reaction with water, therefore the process would be unduly expensive since the amount of hydrogen generated would not economically justify the cost of the europium reagent.

SUMMARY OF THE INVENTION

A cyclic photo-redox process having water and sunlight as reactants and hydrogen and oxygen as products has been developed in accordance with the invention. Though long recognized as inexhaustable and abundant, sunlight is both a diffuse and an intermittent source of energy. The initial photo-redox step results in harvesting and storing the sun's rays during the daylight hours. At night a dark reaction is conducted in which the spent oxidation and reduction reagents are combined and the reaction proceeds to regenerate the reagents for the following daylight production sequence. Preferably one of the reagents is immobilized in a separate phase such as by fixation on a solid support in order to facilitate separation and recycle of the other catalyst.

Other features of the invention relate to the choice of photo-redox reagent catalyst, the form and support of the reagent catalyst and the optimization of parameters for the cyclic production of hydrogen in accordance with the invention.

These and many other attendant advantages and features of the invention will become apparent as the invention becomes better understood, by reference to the following detailed description when considered in conjunction with the accompanying drawings.

DESCRIPTION OF THE PREFERRED EMBODIMENTS

Figure 1:
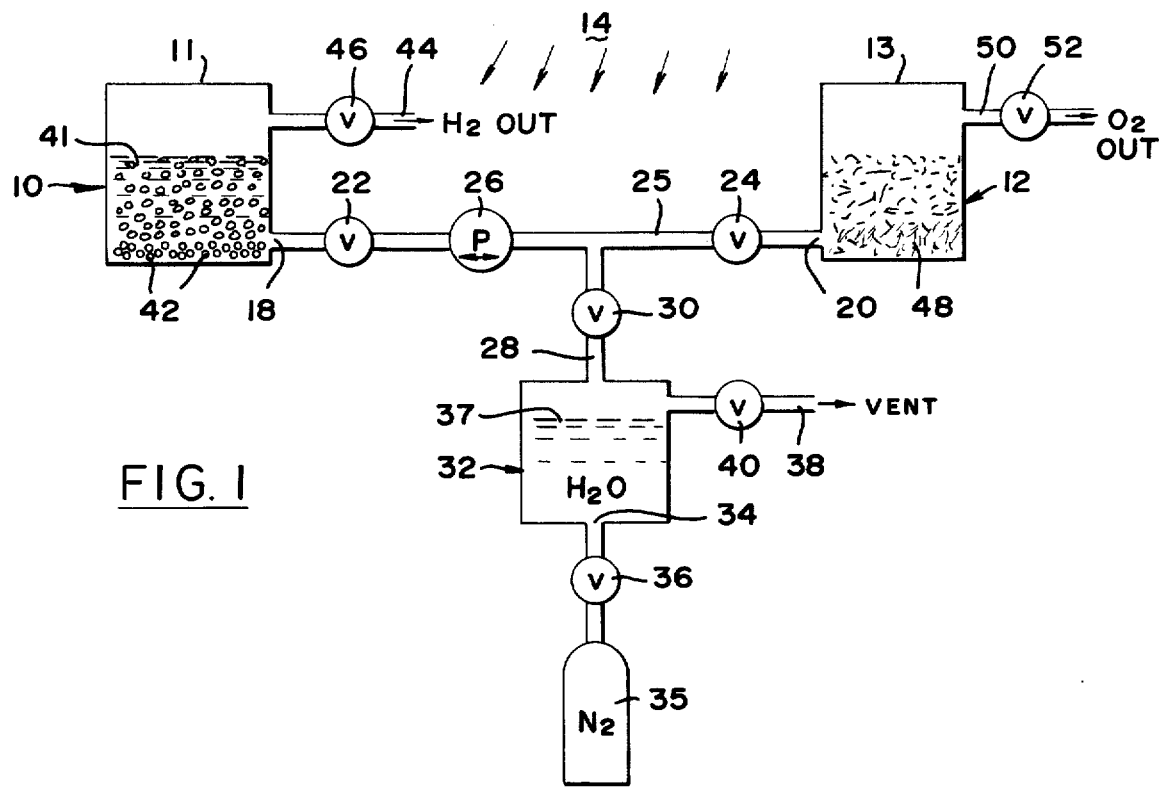
FIG. 1 is a schematic view of a photo-redox apparatus suitable for practice of this invention.

Referring now to FIG. 1, the photolytic hydrogen production system includes a photo-oxidation reactor 10 and a photo-reduction reactor 12 each having a face 11, 13 directed towards and transparent to solar radiation 14. The transparent panels utilized in these reactors must be transparent to the full ground level solar range, i.e. down to 290 nm. Suitable materials are fused silica, sapphire ($Al_2O_3$), Vycor (high silica glass) and Pyrex (borosilicate glass), the latter being preferred.

The reactors each have an inlet, 18, 20 containing a valve 22, 24 joined by a manifold 25 containing a reversible pump 26. The manifold also connects to water inlet line 28, containing a valve 30 which is connected to water supply tank 32. The process of the invention requires ultra pure water. The water may be purified by repeated distillation, reverse osmosis or ion exchange and filtering on activated carbon. Furthermore, the solution in the photo-oxidation reactor 10 must be free of oxygen and the water in the photo-reduction reactor 12 must be free of hydrogen. These gases may be eliminated from the water supply by means of a vacuum pump or by purging with an inert gas, suitably nitrogen, for example, by introducing nitrogen under pressure from tank 35 into inlet 34 when valve 36 is open and purging through vent 38 when valve 40 is open.

The pure, nitrogen purged water 37 is introduced into reactor 10, by opening valves 30 and 22, and by activating pump 26 in the reverse direction. Valve 22 is then closed, valve 24 opened, and pump 26 reversed to pump water 37 into reactor 12.

A heterogeneous hydrogen recombination catalyst 42 is immobilized in photo-oxidation reactor 10. The catalyst 42 is preferably in the form of non-porous beads or fibers on which is deposited, by means well known to the art, highly dispersed metals such as Pt, Rh, Pd, Ir, Os or Ni. The surface of the glass beads or fibers may be in the form received from normal manufacture, or it may be altered by initially etching the surface with dilute HF solution and then depositing on it by means well known to those skilled in the art, hydrogels of silica, alumina or selected combinations of these. The preferred combination is Pt on a glass surface treated with an alumina hydrogel so that the effective catalyst is a Pt on alumina surface. Obviously, a hydrous alumina in the form of beads or fibers may also be used instead of glass beads. However, it is important to note that the bead or fiber substrate must not be microporous; only the very surface (less than a 10 nm layer) may be a microporous (high area). The metal concentration may be in the range of 0.5-0.005% by weight; the preferred range is 0.05-0.01% by weight.

The size of the beads (or the porosity of the fiber mat) is governed by the acid concentration. If the pH = 4, then the maximum spacing between surfaces may not exceed 1.0 nm. Spacings less than this may be used (and will occur in a bed of beads or a glass mat), but excessively small spacings will result in long drainage times of the solution when it is transferred to the reductant after exposure to sunlight. Hence, a spacing (e.g., bead size) will be selected to meet the above specification, and yet have the bed drain in a reasonable time; that time being determined by reactor size in a manner well known to the chemical engineering art.

The photo-oxidant solution 41 in addition to ultra pure water also contains the soluble photo-oxidation reagent. The reagent is a material which absorbs strongly in the solar range at ground level and in its excited state is capable of reducing water to produce hydrogen with a quantum efficiency exceeding 0.1%. Quantum efficiency is defined as the number of moles of hydrogen produced per mole of light absorbed. Suitable water soluble transition metal cations capable of such efficiency are, for example, $Eu^{++}$, $Cr^{++}$, $V^{++}$ and $Ti^{++}$ of which $Eu^{++}$ is preferred. The pH of the solution is no greater than 5, and the preferred range being 4 to 5. A high concentration of from 0.5 to 5M of any of the anions, $Cl^-$, $SO_4^=$, or $PO_4^=$ is maintained by dissolving appropriate amounts of the alkali metal salts of these anions in the solution. Sodium chloride is the preferred anion source.

Hydrogen production proceeds in the photo-oxidation reactor 10 according to the following general reaction scheme:

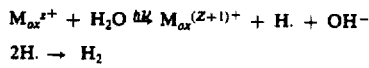

2H· → $H_2$

Where z is the valence of $M_{ox}$. Pure hydrogen separates from the solution as a gas and may be collected through outlet 44 when valve 46 is open. Petroleum source hydrogen is never produced directly in high purity since the "water-gas reaction" of coke and steam gives a product contaminated with carbon monoxide while reforming of hydrocarbons results in methane and higher homolog byproducts present in the produced hydrogen. Only electrolysis has been considered capable of providing directly high purity hydrogen required in many chemical syntheses.

The oxidized cation $M_{ox}^{(z+1)+}$ must be reduced and the pH of the solution, which has been raised by photogenerated $OH^-$, must be lowered in order for the desired cyclic process to proceed. The reduction reactor 12 which provides means to accomplish these aims in accordance with the invention includes an insoluble bifunctional reagent catalyst 48.

One component of the reagent catalyst 48 has the ability to decompose OH· or CLOH·⁻ radicals, provided by Pt, $MnO_2$, PbO, $Fe_3O_4$ or ZnO. The second component has the function of forming a regenerable reductant for the soluble photo-oxidized catalyst, and is suitably a water stable oxychloride of a metal selected from Mn, Ti, V, Cu, Ni, Cd, Sb, Pb or Fe, the preferred metals being Mn, Ti and V. This component is covalently bonded to the surface of a high area support. The bifunctional reagent catalyst is preferably provided as a high surface area, fibrous, glass mat, the porosity of which is adjusted according to the pH of the water used. For pH 7, the preferred initial pH, the maximum particle size the mat may pass is 1 micron. The first component is provided on the support in an amount from 0.01 to 0.5%, preferably 0.01%-0.05% by weight. The concentration of the second component should be in the range of 1/5 to 1/20 to that of the first component with the preferred fraction being 1/10th.

The chemical processes occuring in photo-reduction reactor 12, using Mn and Pt as the components of the bifunctional catalyst are as follows:

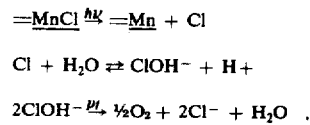

The underlined species =MnCl and =Mn are understood to be covalently bonded surface species. The reaction sequence depicted photolytically prepares =Mn, the reducing agent; HCl (dissolved in the water); and a gas, $O_2$. The $O_2$ is collected through outlet 50 when valve 52 is open. Due to the dilute nature of the light absorbing species (=MnCl in the example), the photolysis vessel may be divided into several compartments by transparent sheets.

Either glass fibers with surfaces unaltered from those resulting in the manufacturing process, or altered by etching (by HF solution for example) then coated with a hydrogel (silica, alumina or silica alumina) may be used. The preferred form is a thin (no greater than 10 nm) layer of hydrous silica. As in the case of the catalyst used in the photo-oxidation reactor it is undesirable to have the bulk of the fibers microporous (because of the solution transfer requirement); hence, only the fiber surface should be microporous.

An extended photoactive range may be obtained by the use of a photochromic glass, in which the composition of the beads or fiber is altered (at the time of manufacture) to make the glass photochromic. Additions of silver halides, copper halides, iron (ferric) halides, will provide glasses with photochromic properties.

The dark regeneration reaction is practiced by operating after sunset or by placing an opaque cover over the transparent faces 11,13. Valves 22 and 24 are opened and pump 26 is activated to pump the photo-oxidant solution 41 into photo-reduction reactor 12. The dark reaction is illustrated in the following formulas in the case of $Eu^{+++}$ as the exhausted, photo-oxidant oxidized reagent, $M_{ox}^{(z+1)+}$:

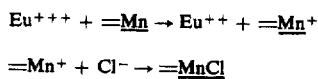

The solution containing the reduced photo-oxidation cation $Eu^{++}$ is then returned to the photo-oxidation reactor 10 for the next light cycle of $H_2$ production by opening valves 24 and 22 and pumping the solution through manifold conduit 25 from photo-reduction reactor 12 into reactor 10. The oxidized, supported, photo-reduction reagent-catalyst (=MnCl) may be washed with water by opening valves 24 and 30 while valve 22 is closed and pumping water from supply 32 into photo-reduction reactor 12. These washings can then be transferred to photo-oxidation reactor 10 as makeup water for the next cycle.

The photo-reduction reaction is preferably operated at an initial pH of about 7 with a bifunctional reagent-catalyst containing ≡M_red X where X is Cl, Br, I, F or CN, highly dispersed on a fibrous glass mat catalyst, the surface of which destroys OH. radicals or their adducts (e.g. ClOH.-) very efficiently. The metal and semimetallic halides ca be covalently bonded to the glass surface by reaction of a metal halide with a partially dehydroxylated glass surface under anhydrous conditions.

After heating the glass fiber to adjust the density of surface hydroxyl groups, the glass mat is heated with metal halide according to the following reaction:

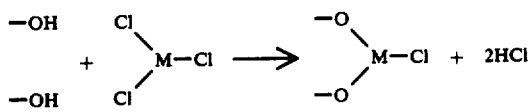

Alternatively, anhydrous hydrocarbon solution of the alkoxy metal halide may be utilized or a co-gel of the two metals can be prepared, adjusting the pH to assure a metal chloride grouping is present in the final reagent.

Figure 2:
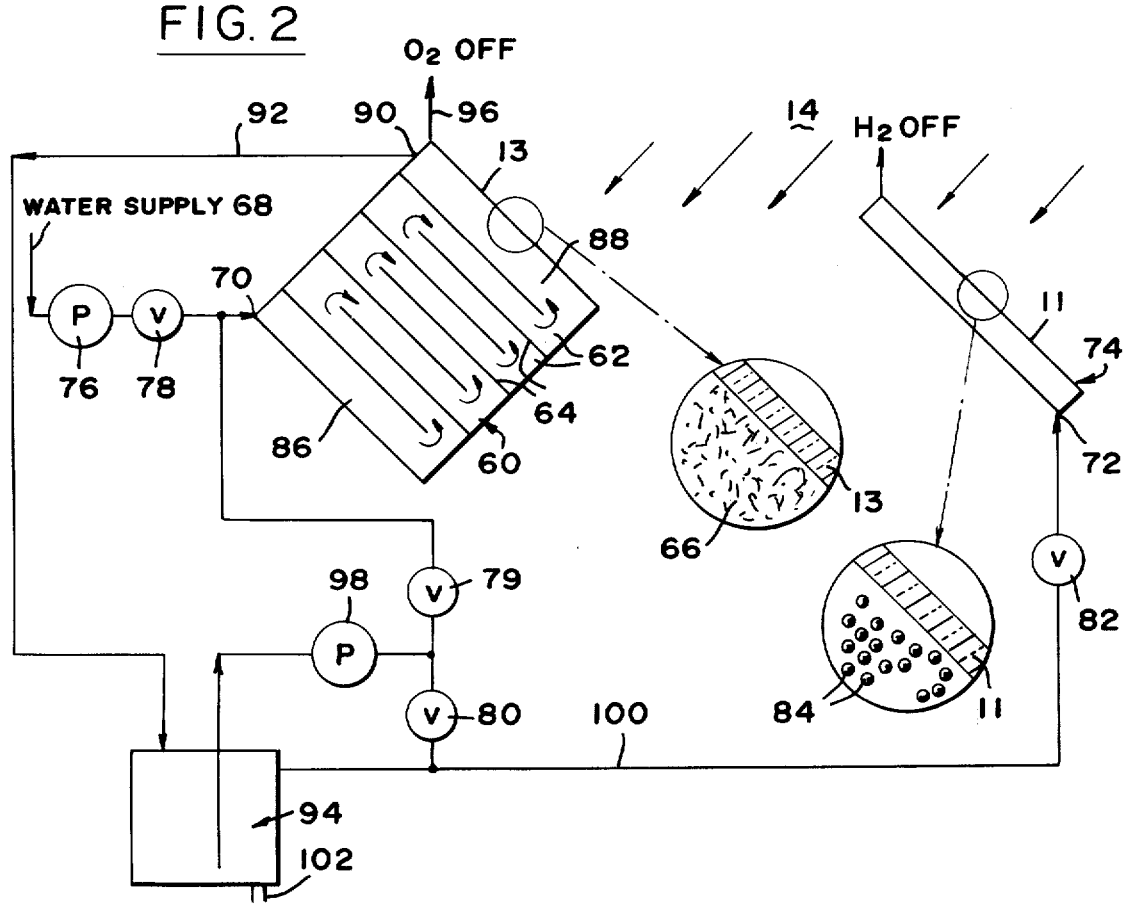
FIG. 2 is a schematic view of a second embodiment of a photo-redox apparatus.

A further embodiment of a solar photolysis apparatus is illustrated in FIG. 2, Due to the necessity to operate the photo-reduction reactor 60 with a very dilute concentration of the light absorbing species, such as ≡MnCl, the vessel 60 is divided into components 62 by means of transparent partial panels 64. The vessel 60 contains a highly dispersed bifunctional catalyst such as glass fibers 66 on which is deposited the light absorbing reducing catalyst and the OH. or ClOH. decomposition catalyst.

Water is pumped continuously from water supply 68 into the inlet 70 to photo-reduction reactor 60 and the inlet 72 to the photo-oxidation reactor 74 by means of pump 76 when valves 78, 79, 80 and 82 are open. The photo-oxidation reactor 74 is filled with beads 84 on which is deposited the hydrogen recombination catalyst. After the initial charge of water to reactor 74 the soluble photo-oxidation catalyst is added and valves 79, 80 and 82 are closed.

The water is pumped into the lowermost compartment 86, most remote from the surface 13 on which the sunlight 14 is incident and proceeds upwardly past panel dividers 64 into the uppermost compartment 88. The solution in compartment 88 is high in HCl content. This solution is pumped through outlet 90 through line 92 into mixing vessel 94. Oxygen is collected through gas outlet 96.

After a photo-redox cycle is completed, pump 76 is turned off and valves 78 closed. Valve 82 is opened and the spent solution from photo-oxidation reactor 74 is drained into mixing tank 94. The HCl solution adjusts the pH of the spent solution and the mixed solutions are pumped through vessel 60 by means of pump 98 when valve 79 is open. The catalyst regeneration reaction carried out in the dark either at night or by shielding the transparent panel 13 from the sunlight.

The mixed solution passes through vessel 60 and returns to the mixing tank 94 and with valve 80 closed and valve 82 open to the reactor 74. Pump 98 is then turned off and valve 79 closed and valve 78 opened. When pump 76 is energized, the regenerated photo-reduction catalyst is washed with pure water and these washings pass through line 92 to the mixing vessel and line 100 into reactor 74. Valve 82 is then closed and tank 94 drained through drain 102. The system is now ready for a second photolysis cycle.

It is to be realized that only preferred embodiments of the invention have been described and that numerous substitutions, alterations and modifications may be made without departing from the spirit and scope of the invention as defined in the following claims.

What is claimed is:
1. A method of photolyzing water comprising the steps of:
applying solar radiation to a first vessel containing an aqueous solution of a water soluble photo-oxidizable reagent and generating hydrogen gas therefrom while forming a spent solution containing oxidized, spent reagent;
applying solar radiation to a second vessel containing water and a water insoluble photoreducible reagent catalyst and generating oxygen gas therefrom while forming spent, reduced photoreducible reagent catalyst;
combining the spent solution containing oxidized photo-oxidizable reagent with the spent reduced photo-reducible reagent catalyst and regenerating said reagents in the dark to form a solution of regenerated photo-oxidizable reagent containing water-insoluble, regenerated photo-reducible reagent catalyst.

2. A method according to claim 1 in which the soluble photo-oxidizable reagent is a material which absorbs strongly in the solar range at ground level and is capable of photolyzing water to produce hydrogen with a quantum efficiency exceeding 0.1%.

3. A method according to claim 2 in which the reagent is a transition metal cation selected from $Eu^{++}$, $Cr^{++}$, $V^{++}$ and $Ti^{++}$ and the pH of the solution is no more than 5.

4. A method according to claim 3 in which the solution further contains 0.5 to 5M of $Cl^-$, $SO_4^=$ or $PO_4^=$.

5. A method according to claim 1 in which the photo-oxidation reaction is conducted in a first vessel, having one wall transparent to sea level solar radiation and the other walls opaque to said radiation, the photo-reduction reaction is carried out in a second vessel having one wall transparent to sea level solar radiation and the other walls opaque to said radiation, and further including the step of transferring the spent solution from the first vessel to the second vessel for regenerating said reagents.

6. A method according to claim 5 further including the step of returning the solution containing regenerated photo-oxidizable reagent to the first vessel.

7. A method according to claim 5 further including the step of placing an opaque cover over the transparent wall of the second vessel during regeneration.

8. A method according to claim 5 in which the first vessel further contains an insoluble, hydrogen recombination catalyst immobilized on a support.

9. A method according to claim 8 in which the recombination catalyst is selected from Pt, Rh, Pd, Ir, Os and Ni.

10. A method according to claim 9 in which the support is non porous glass beads or fibers.

11. A method according to claim 10 in which the metal concentration of the recombination catalyst is 0.5 to 0.005% by weight.

12. A method according to claim 10 in which the surface of the glass support contains a deposited layer of a silica or alumina hydrogel.

13. A method according to claim 12 in which the recombination catalyst comprises Pt deposited on an alumina hydrogel coated glass bead.

14. A method according to claim 5 in which the insoluble photo-reducible reagent catalyst contains a first component capable of decomposing OH. or ClOH.- radicals and a second component comprising a regenerable reductant for the soluble photo-oxidizable reagent.

15. A method according to claim 14 in which the first component comprises Pt, $MnO_2$, PbO, $Fe_3O_4$ or ZnO.

16. A method according to claim 14 in which the second component comprises a water stable oxychloride of a metal selected from Mn, Ti, V, Cu, Ni, Cd, Sb, Pb or Fe.

17. A method according to claim 16 in which both components are supported on a high area support.

18. A method according to claim 17 in which the first component is present on the support in an amount from 0.01 to 0.5% and the second component is provided on the support in an amount from 1/5 to 1/20 of the amount of the first component.

19. A method according to claim 17 in which the second component is covalently bonded to a fibrous glass support.

20. A method according to claim 19 in which the glass support contains a photochromic additive to increase the photoactive range.

21. A method according to claim 20 in which the additive is selected from silver, copper or iron halides.

22. An apparatus for the photolysis of water comprising in combination:
 a first vessel for receiving an aqueous solution of photo-oxidizable reagent and having at least one wall portion transparent to solar radiation, said first vessel containing an immobilized, insoluble hydrogen recombination catalyst, and having a hydrogen gas outlet;
 a second vessel having at least one wall portion transparent to solar radiation and containing an immobilized photo-reduction reagent-catalyst, and having an oxygen gas outlet;
 photo-reagent regenerating means including means for transferring solution containing oxidized, photo-oxidizable reagent from the first vessel to the second vessel, for conducting a reaction in the dark in which the oxidized, photo-oxidizable reagent is reduced and the immobilized, reduced photo-reduction reagent-catalyst is oxidized and including means for recycling the solution to the first vessel.

23. An apparatus according to claim 22 in which the immobilized hydrogen recombination catalyst is selected from Pt, Rh, Pd, Ir, Os or Ni deposited on nonporous glass beads or fibers.

24. An apparatus according to claim 23 in which the immobilized photo-reduction reagent-catalyst comprises two components deposited on a high area support, the first component being capable of decomposing OH. or ClOH.- radicals and the second component comprising a regenerable reductant for the soluble photo-oxidizable reagent.

25. An apparatus according to claim 24 in which the first component is selected from Pt, $MnO_2$, $Fe_3O_4$ or ZnO and the second component is covalently bonded to the support and is selected from a water stable oxychloride of Mn, Ti, V, Cu, Ni, Cd, Sb, Pb or Fe.

26. An apparatus according to claim 22 in which the photo-reagent regenerating means further includes opaque cover means for covering the transparent wall portion of the second vessel during reagent regeneration.

* * * * *